Nov. 11, 1969  R. C. FINK  3,478,192
ELECTRICALLY HEATED PLATEN
Filed April 25, 1968  3 Sheets-Sheet 1

INVENTOR.
ROBERT C. FINK
BY
ATTYS.

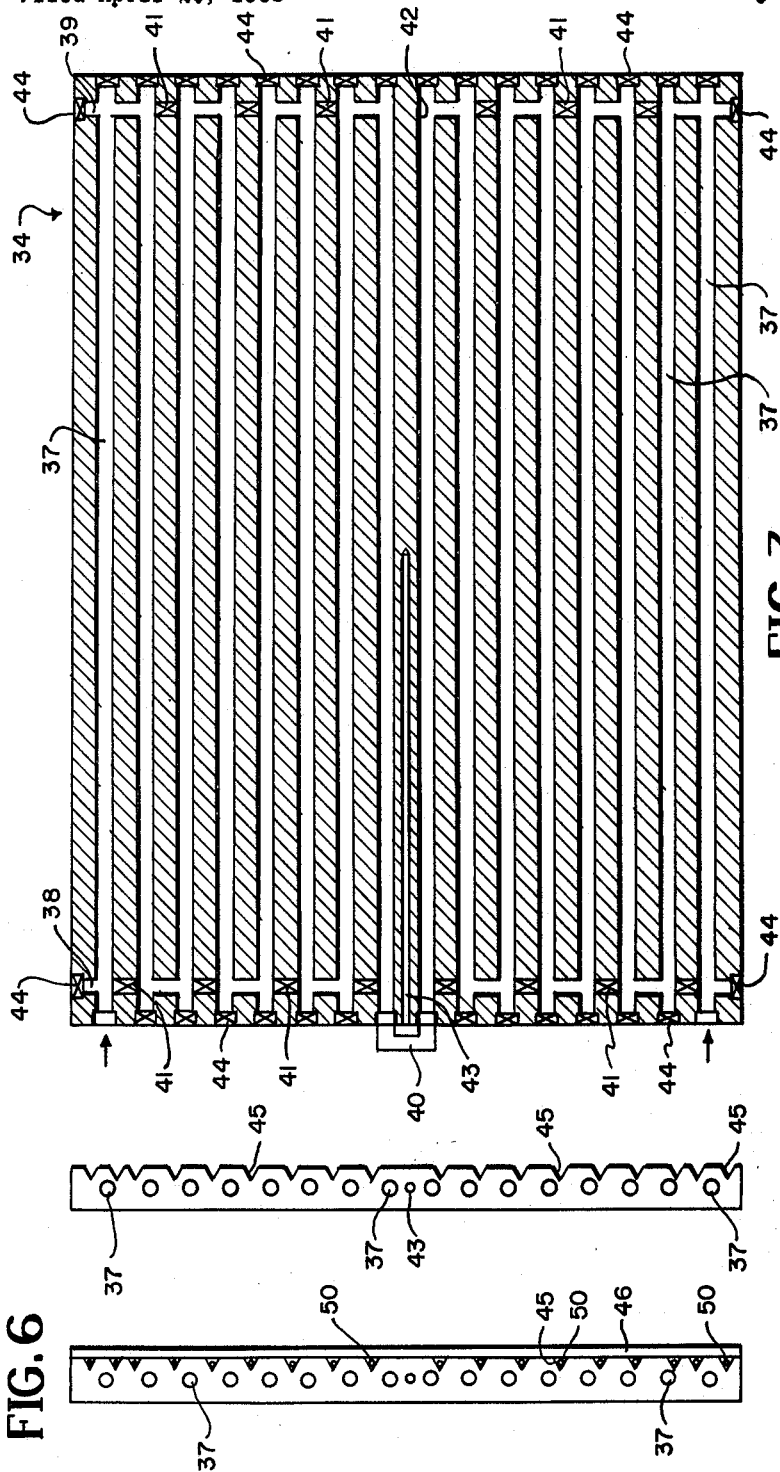

INVENTOR.
ROBERT C. FINK
BY Dominik, Stein & Knechtel
ATTYS.

United States Patent Office 3,478,192
Patented Nov. 11, 1969

3,478,192
ELECTRICALLY HEATED PLATEN
Robert C. Fink, Chicago, Ill., assignor to Ostrander-Seymour Co., Melrose Park, Ill., a corporation of Illinois
Filed Apr. 25, 1968, Ser. No. 724,123
Int. Cl. H05b 1/00, 3/02; F28d 15/00
U.S. Cl. 219—243
2 Claims

ABSTRACT OF THE DISCLOSURE

Heating plates having a number of circulating convoluted openings therein in an off-center relationship with heating elements which are affixed to the heating plates to electrically heat them. A closed circulating system including an expansion chamber and a small capacity pump is employed to circulate the oil through the convoluted openings within the heating plates. The oil circulated through the convoluted openings is heated by the same heating elements which electrically heat the heating plates, and functions to equalize the temperature of the heating plates, over the entire top surface area thereof.

---

This invention relates to improved heating plates.

In many presses, particularly those used in the graphic arts field to mold plastic matrices and rubber plates for printing, the fixed and movable platens thereof usually have heating plates affixed to them, for heating the material to be treated. In the past, these heating plates either have been electrically heated, or else steam or a highly heated fluid, such as hot oil, for example, have been circulated through them to heat them. All of these prior methods are objectionable, for one reason or another.

For example, in many areas of the country, electrical power is costly, and electrically heating the heating plates therefore is not the most economical method which could be used. It would be much cheaper, for example, to heat them with steam or hot oil. In certain cities in other areas of the country, the city codes require the presence of a licensed engineer capable of maintaining and operating the boilers used in conjunction with the steam and hot oil systems. In such cases, it is difficult to justify the expense of these licensed engineers, and it is less expensive to use electrical power.

The use of steam also presents a problem in many areas where only hard water is found. This water usually has to be conditioned or softened before it can be used, otherwise the boilers, pipes and the like are deleteriously affected by the mineral deposits which form in them. Frequent cleaning usually is necessary.

Hot oil systems usually are objectionable because of the floor space required to install such a system. Also, a large oil reservoir usually is required, and the hot oil is circulated through the heating plates at a rate of approximately 30 gallons per minute. The latter, of course, requires the use of a relatively large capacity pump.

In each case also, heating plates usually are heated in a manner such that it is extremely difficult to maintain a uniform temperature over the entire surfaces thereof.

Accordingly, it is an object of the present invention to provide improved heating plates.

Another object is to provide improved heating plates constructed in a fashion such that a more uniform temperature can be maintained over its entire surface.

Still another object is to provide improved heating plates which can be electrically heated, heated by means of steam or a highly heated uuid such as hot oil circulated through them.

Still another object is to provide improved heating plates adapted to have hot oil circulated through them, which oil is heated by means of electrical heating elements affixed to the heating plates.

A still further object is to provide improved heating plates constructed in a fashion such that only a small expansion chamber which functions as a reservoir and a small capacity pump are required to supply and to circulate the oil through the heating plates.

Other objects of the invention will in part be obvious and will in part appear hereinafter.

The above objectives are accomplished by providing a number of circulating convoluted openings within the heating plates, in an off-center relationship with heating elements which are affixed to the heating plates to electrically heat them. A closed circulating system including an expansion chamber and a small capacity pump is employed to circulate the oil through the convoluted openings within the heating plates. The oil circulated through the convoluted openings is heated by the same heating elements which electrically heat the heating plates, and functions to equalize the temperature of the heating plates, over the entire top surface area thereof.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 3 is a sectional view taken transversely through one of the heating plates, illustrating its internal construction;

FIG. 4 is a sectional view taken along lines 4—4 of FIG. 3;

FIG. 5 is an end plan view of the heating plate of FIG. 3, with its cover plate removed;

FIG. 6 is an end plan view of the heating plate of FIG. 3 with its cover plate affixed to it;

Figure 7:
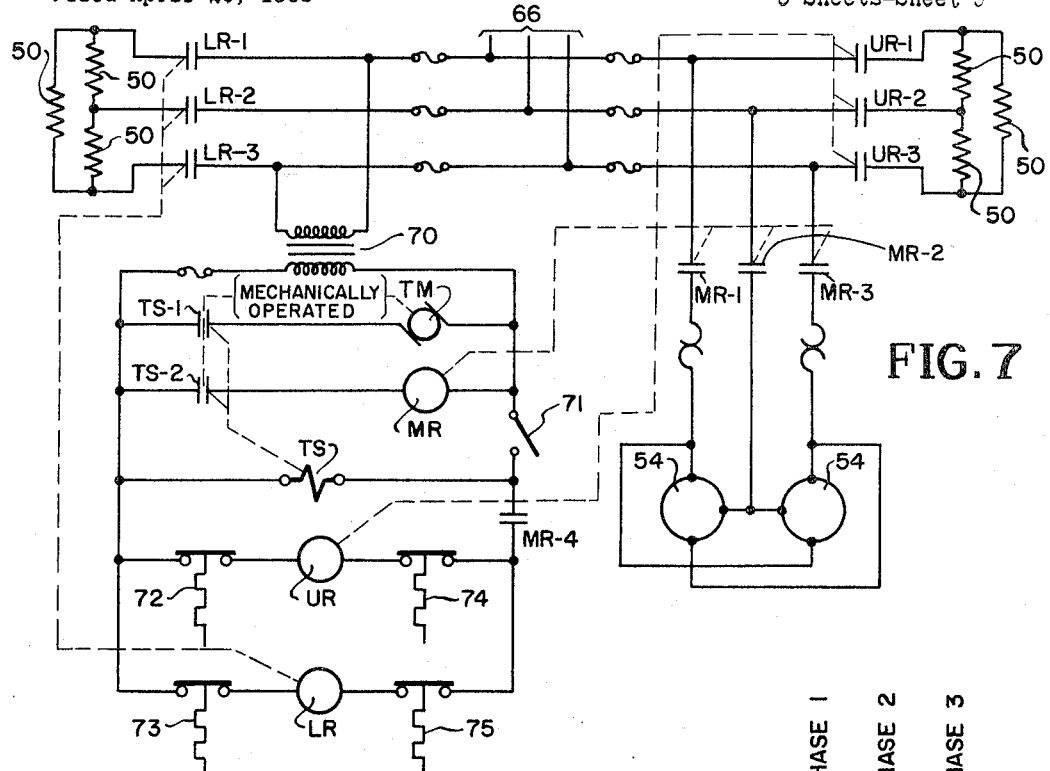
Figure 8:
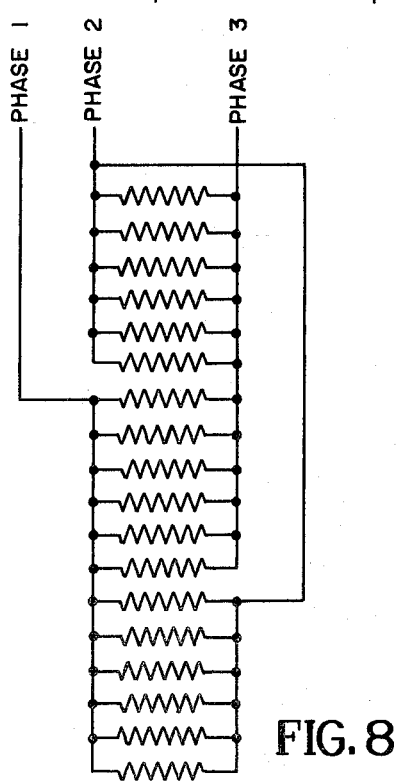
Figure 9:
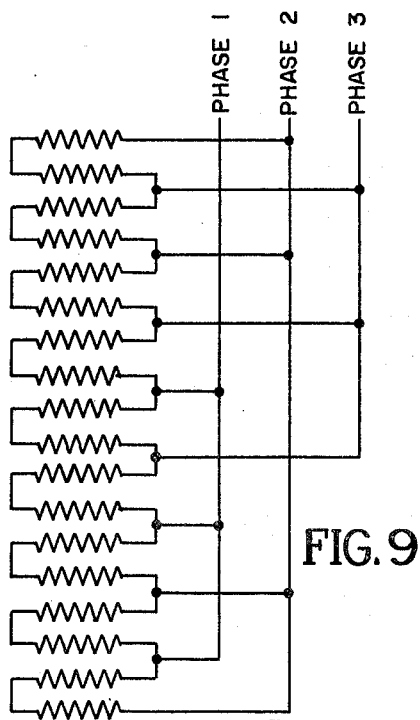

FIG. 7 is a schematic drawing of the control circuitry for the heating system for the heating plates; and FIGS. 8 and 9 are schematic diagrams generally representing the manner in which the electrical heating elements can be electrically coupled to a 3-phase source of power for 220 v. and 240 v. operation, respectively.

Similar reference characters refer to similar parts throughout the several views of the drawings.

Figure 1:
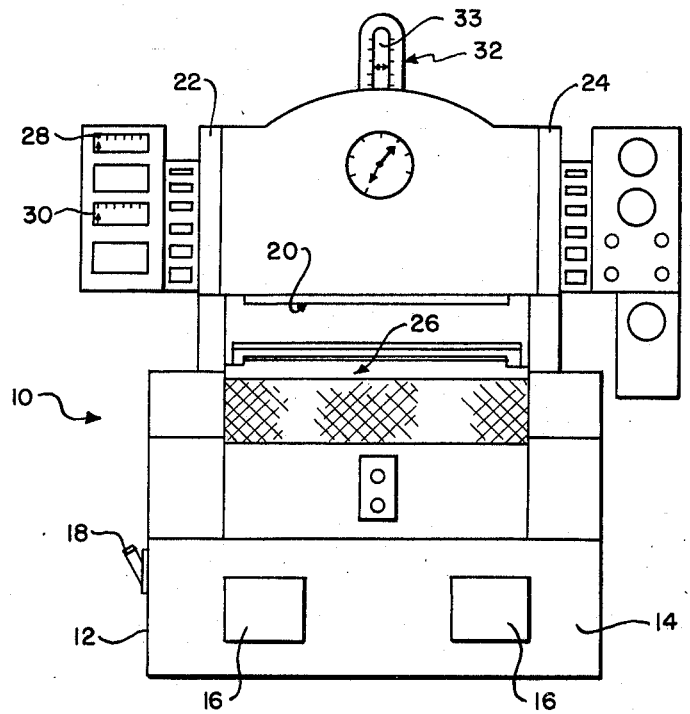
FIG. 1 is a front plan view of a press exemplary of the type including the heating plates of the present invention.

Referring now to the drawings, in FIG. 1 there is shown a press 10 which is of conventional construction and may be, for example, a press of the type sold under the name of "Moldmaster" by the Ostrander-Seymour Company of Melrose Park, Ill. Basically, the press 10 has a base 12 in which there is an oil tank 14 having two removable clean-out covers 16. An oil tank filler tube 18 is provided for filling the oil tank 14. The press 10 also has a fixed upper platen 20 secured between a pair of upright side rails or plates 22 and 24 and a lower movable platen 26 movably secured within the framework of the press, in the manner well known in the art. Both the fixed upper platen 20 and the movable lower platen 26 are adapted to be heated, in the manner described below. A pair of temperature indicators 28 and 30 are provided so that the operating temperature of the platens 20 and 26 are known at all times. An expansion tank 32 which also functions as an oil reservoir for oil which is circulated through the upper and lower platens 20 and 26, respectively, is affixed to the rear of the press 10 in a fashion such that it can be observed by the operator while operating the press 10. The expansion tank 32 has a gauge 33 for indicating the level of the oil therein.

Figure 2:
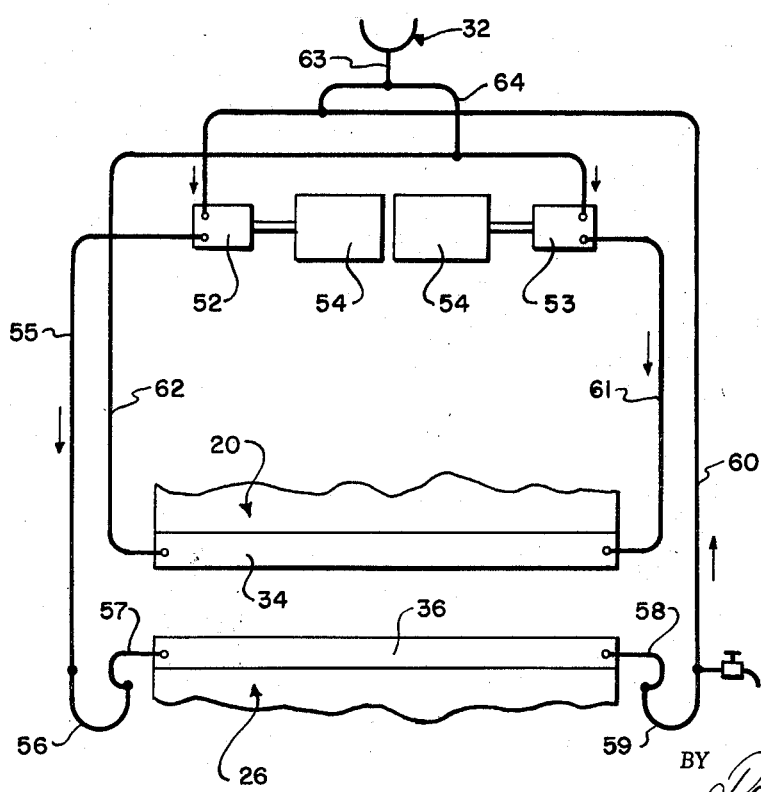
FIG. 2 is a diagrammatic representation of the heating plates and the apparatus for heating them and circulating the oil through the convoluted openings therein.

The platens 20 and 26, as generally illustrated in FIG. 2, have heating plates 34 and 36 affixed to and forming an integral part of them, respectively. These heating plates 34 and 36 can be of like construction and, as can be best seen in FIGS. 3–6 wherein the heating plate 34 is illustrated, they are bored to provide a number (16 as illustrated) equally spaced, parallel passageways 37 which are coupled by means of manifolds 38 and 39. These manifolds 38 and 39 each extend only approximately one-half way through the heating plates so as to provide a centrally disposed separator 42 having an aperture 43 formed in it for receiving a temperature sensing probe (not shown) which is used to control the heating system for the plates 34 and 36, respectively. A continuous circulus path through the passageways 37 and the manifolds 38 and 39 is provided by means of baffle plates 41 affixed within the manifolds and a generally U-shaped coupler 40 for coupling the passageways 37 on the opposite sides of the separator 42 together. The open ends of the passageways 37 and the manifolds 38 and 39 are closed by means of caps 44 which may be threadedly affixed within them.

As can be best seen in FIGS. 5 and 6, a number (18) of generally triangular-shaped slots 45 are formed in one side of the heating plates 34 and 36. These slots 45 extend parallel to the passageways 37 and are offset slightly to one side of them, as illustrated. Each of the slots 45 is associated with an individual one of the passageways 37, with the exception of the two outermost ones of the passageways 37 which have two of the slots 45 disposed offset on each of its opposite sides. These passageways 37 have two of the slots 45 associated with them so as to provide and maintain a more uniform temperature at the outer edges of the heating plates 34 and 36.

These triangular-shaped slots 45 each is adapted to receive a triangular-shaped heating element 50 which can be, for example, a triangular-shaped Chromalox tubular element, type TS or TI, manufactured by the Edwin L. Wiegand Company in Pittsburgh, Pa. These heating elements 50 are press-fitted into the triangular-shaped slots 45 so as to establish good conductive contact with the heating plates and to eliminate air spaces or pockets which would tend to insulate and prevent the transfer of heat to the heating plates. A cover plate 46 thereafter is affixed to the heating plates 34 and 36, to fixedly retain the heating elements within the slots 45.

The heating plates 34 and 36 are fixedly secured to the upper and lower platen 20 and 26, respectively, in any suitable fashion, for example, by threaded bolts (not shown). Oil is circulated through the heating plates 34 and 36, in the manner generally illustrated in FIG. 2. As can there be seen, a pair of pumps 52 and 53 are provided which pumps can be, for example, Roper pumps with mechanical seals of the type manufactured by Roper Hydraulics, Inc., and these pumps are operated by means of motor means 54 which can be individual electric motors for operating the pumps 52 and 53, respectively, as illustrated, or a single electric motor adapted to operate both pumps simultaneously. The pump 52 is coupled to the heating plate 36 and is adapted to pump oil to and through it in the direction of the arrows, through the oil lines 55 and 57 and the flexible hose 56. The oil, after circulating through the heating plate 36, is coupled back to the pump 52 through the oil lines 58 and 60 and the flexible hose 59. The flexible hoses 56 and 59 permit the platen 26 to be raised and lowered. The pump 53 is coupled to the heating plate 34 and is adapted to pump oil through it in the direction of the arrows, which direction it may be noted is in the opposite direction in which it is pumped through the heating plate 36, through the oil line 61. After circulating through the heating plate 34, the oil is coupled back to the pump 53 through the oil line 62. The expansion tank 32 is coupled to the oil lines 60 and 62 by means of the branch oil lines 63 and 64. Initially, sufficient oil is provided in the system to fill the passageways 37 in the heating plates 34 and 36, and the oil lines and the flexible hoses coupling the pumps and the heating plates. The expansion tank 32 in addition to compensating for the expansion and contraction of the oil within the system as it heats and cools, functions as a small reservoir for the oil circulating system. The motor means 54 and the pumps 52 and 53 are adapted to circulate the oil through the heating plates 34 and 36 at a rate of approximately 3 gallons per hour.

In FIG. 7, the electrical circuitry for controlling the operation of the heating elements 50 and the motor means 54 is illustrated, and it can be seen that the heating elements 50 affixed to the heating plates 34 and 36 are coupled to a 3-phase source of power 66. As indicated above, as illustrated, 18 slots 45 and hence 18 heating elements 50 are affixed to each of the heating plates 34 and 36. These heating elements can be electrically coupled to the 3-phase source of power 66 as illustrated in FIGS. 8 and 9 for 220 v. and 440 v. operation, respectively. The motor means 54 also are coupled to the 3-phase source of power 66, through relay contacts MR–1, MR–2 and MR–3 of a relay MR. A step-down transformer 70 is coupled to the 3-phase source of power 66 and is adapted to provide a 110 v. source to the control circuitry for the heating elements 50 and the motor means 54. This control circuitry probably can be best described by describing the manner in which it controls the operation of the heating elements 50 and the motor means 54.

The heating plates 34 and 36 are energized to heat them by first closing an On-Off switch 71 which operation permits current to flow through a solenoid TS to operate the same. The solenoid TS operate and closes its contacts TS–1 and TS–2 which contacts remain closed until they are mechanically opened by a timer TM. The contact TS–1 in closing energizes the timer TM, and the contact TS–2 in closing energizes and operates a mercury magnetic relay MR. The relay MR, in operating, closes its contacts MR–1, MR–2 and MR–3 and thereby energizes the motor means 54 to operate the pumps 52 and 53 to start the circulation of oil through the heating plates 34 and 36. Also, at its contact MR–4, a circuit is closed to energize a pair of mercury magnetic relays UR and LR having contacts UR–1, UR–2 and UR–3 and LR–1, LR–2 and LR–3, respectively, which close to couple the 3-phase source of power 66 to the heating elements 50. These relays UR and LR are controlled by means of the temperature sensing probes 72 and 73, respectively, which are affixed within respective ones of the apertures 43 formed in the heating plates 34 and 36 so as to maintain them at a predetermined temperature. Temperature sensing devices 74 and 75 also are included in the coupling between the source of power and the relays UR and LR, respectively, and are adapted to open the circuits at a predetermined temperature, for safety purposes to prevent the heating plates 34 and 36 from overheating.

When the press 10 is shut down and the heating plates 34 and 36 are turned off to permit them to cool, the On-Off switch 71 is opened which action, in turn, opens the energizing circuit for the relays UR and LR. These relays, in restoring, open their respective contacts so that the source of power 66 is disconnected from the heating plates 34 and 36. The solenoid TS is de-energized, however since, as indacted above, its contacts TS–1 and TS–2 remain closed until they are mechanically opened by the timer TM. The relay MR also remains energized and, in turn, maintains the motor means 54 energized, for some period of time dependent upon the operation of the timer TM, so that the oil is continued to be circulated through the heating plates 34 and 36 until they have had an opportunity to cool down. When the timer TM times out, it opens the contacts TS-1 and TS-2 and thereby opens the energizing circuit for both the timer TM and the relay MR. When the relay MR restores, its contacts MR-1, MR-2 and MR-3 operate to open the energizing circuit for the motor means 54.

From the above description, it can be seen that the motor means 54 are energized to circulate the oil through the heating plates 34 and 36 simultaneously with the energization of the heating elements 50. In addition, the oil is circulated for a predetermined time after the heating elements have been de-energized. The oil therefore is continuously circulated and is thereby prevented from caking or otherwise congealing on the side walls of the passageways 37 and the manifolds 38 and 39 in the heating plates.

The oil within the system is not preheated before being circulated through the heating plates 34 and 36 so that the hot oil reservoir and the apparatus for heating the oil within the hot oil reservoir both are eliminated with the system of the present invention. This fact alone provides substantial savings in floor space and, furthermore, eliminates the need to have a licensed engineer present when the press 10 is in operation. The heating plates 34 and 36 actually are heated by the heating elements 50, and as these heating plates heat up, the oil circulating through the passageways 37 and the manifolds 38 and 39 therein likewise is heated. The oil upon being heated functions to maintain a more uniform distribution of heat throughout the entire area of the heating plates 34 and 36. In other words, the oil functions as a heat distributor to equalize and to maintain the distribution of the heat of the heating plates 34 and 36.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood tht the following claims are intended to cover all the generic and specific features of the invention herein described, and all statements of the scope of the invention, which, as a matter of language, might be said to fall therebetween.

Now that the invention has been described, what is claimed as new and desired to be secured by Letters Patent is:

1. A heating plate for use in presses and the like comprising, in combination: a plurality of spaced-apart, parallel passageways extending across substantially the length of said heating plate in one direction thereof parallel to the respective side edges of said heating plate and substantially occupying the surface area of said heating plate in a crosswise direction thereof, said passageways being filled with oil and being coupled together to provide a continuous circuitous passageway through said heating plate through which said oil can be circulated; oil circulating means for circulating said oil through said passageway; a plurality of electrical heating elements affixed to said heating plate so as to extend parallel to said passageways for both heating said heating plate and said oil circulated therein, said oil upon being heated establishing and maintaining a uniform distribution of heat in said heating plate; a control circuit for controlling the energization of said heating elements and said oil circulating means, said control circuit comprising means operable to substantially simultaneously energize said heating elements and said oil circulating means and timer means for maintaining said oil circulating means energized for a predetermined period of time after said heating elements are de-energized, whereby said oil is circulated through said passageways while said heating plate cools to prevent said oil from caking or congealing on the sidewalls of said passageways; and temperature control means imbedded in said heating plate for controlling said electrical heating elements to substantially maintain said heating plate at a predetermined temperature.

2. A heating plate for use in presses and the like comprising, in combination: a plurality of spaced-apart, parallel passageways extending across substantially the length of said heating plate in one direction thereof parallel to the respective side edges of said heating plate and substantially occupying the surface area of said heating plate in a crosswise direction thereof, said passageways being filled with oil and being coupled together to provide a continuous circuitous passageway through said heating plate through which said oil can be circulated; oil circulating means for circulating said oil through said passageway; a plurality of electrical heating elements affixed to said heating plate so as to extend parallel to said passageways for both heating said heating plate and said oil circulated therein, said oil upon being heated establishing and maintaining a uniform distribution of heat in said heating plate; a control circuit for controlling the energization of said heating elements and said oil circulating means, said control circuit comprising timer means, first means for controlling the operation of said oil circulating means, second means for controlling the initial operation of said first means and for energizing said timer means, third means controlled by said first means for initially energizing said electrical heating elements, and temperature control means imbedded in said heating plate for controlling said electrical heating elements to establish a predetermined temperature, said timer means upon being energized controlling the subsequent operation of said first means, whereby said oil circulating means are maintained operated by said timer means after said third means are operated to de-energize said electrical heating elements.

References Cited

UNITED STATES PATENTS

| | | | |
|---|---|---|---|
| 2,880,301 | 3/1959 | Naxon | 219—436 |
| 1,550,185 | 8/1925 | Steenstrup | 219—243 X |
| 1,903,898 | 4/1933 | Kranzlein | 219—243 |
| 2,101,110 | 12/1937 | Thornton | 29—457 |
| 2,510,207 | 6/1950 | Behnke et al. | 219—130 |
| 3,303,324 | 2/1967 | Appleman | 219—213 X |
| 3,393,292 | 7/1968 | Ritscher | 219—245 |

FOREIGN PATENTS

| | | |
|---|---|---|
| 487,310 | 6/1938 | Great Britain. |
| 437,665 | 11/1926 | Germany. |
| 448,694 | 6/1936 | Great Britain. |

OTHER REFERENCES

Brockel, German application 1,033,223, pub. July 1958.

JOSEPH V. TRUHE, Primary Examiner

PETER W. GOWDEY, Assistant Examiner

U.S. Cl. X.R.

165—107, 168